May 6, 1958 L. J. LYONS 2,833,600
RAILWAY AXLE JOURNAL BEARING
Filed May 2, 1955 2 Sheets-Sheet 1
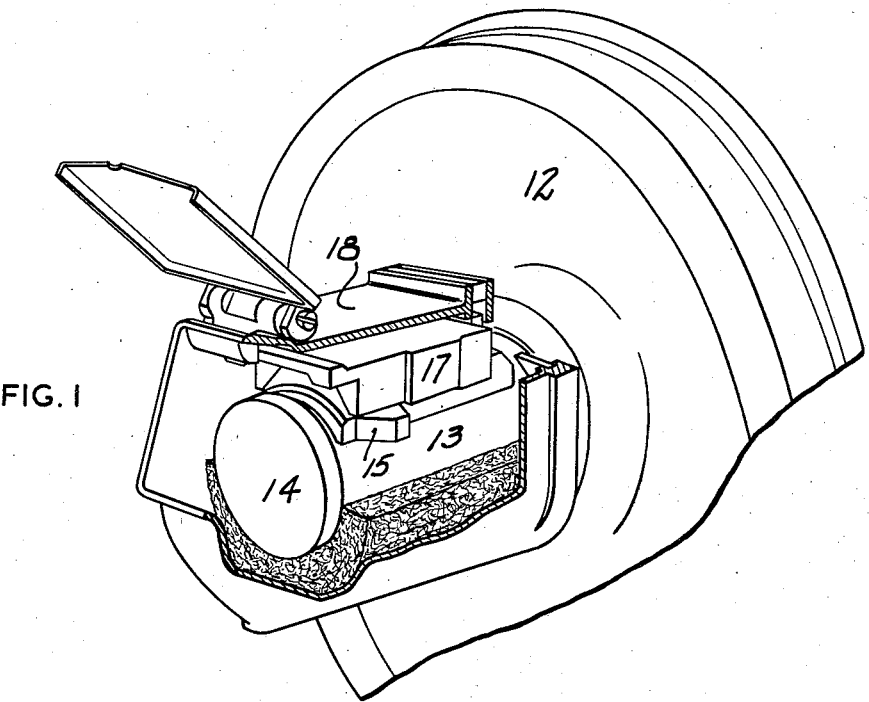
FIG. I
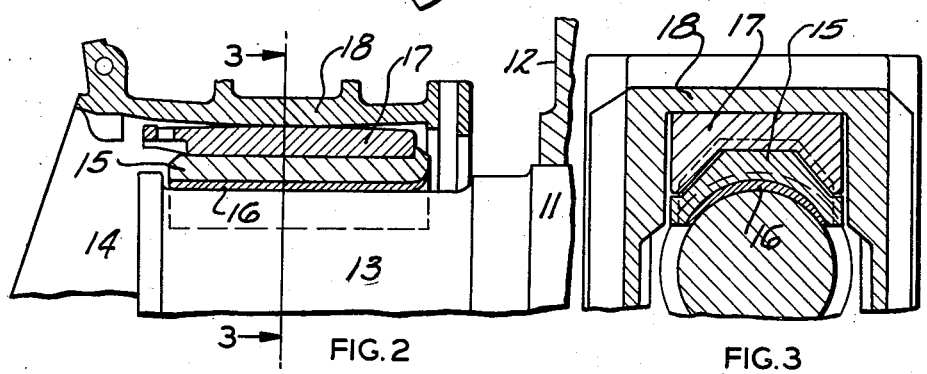
FIG. 2 FIG. 3
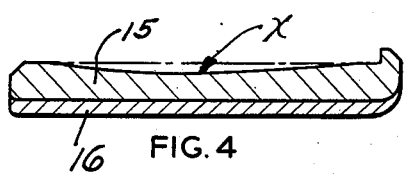
FIG. 4
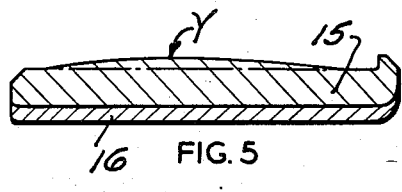
FIG. 5
INVENTOR.
Lee J. Lyons
BY Rodney Bedell
atty.

May 6, 1958  L. J. LYONS  2,833,600
RAILWAY AXLE JOURNAL BEARING
Filed May 2, 1955  2 Sheets-Sheet 2

INVENTOR.
Lee J. Lyons
BY Rodney Bedell
atty.

United States Patent Office 2,833,600
Patented May 6, 1958

2,833,600

RAILWAY AXLE JOURNAL BEARING

Lee J. Lyons, Webster Groves, Mo.

Application May 2, 1955, Serial No. 505,204

6 Claims. (Cl. 308—53)

This invention relates to railway axle journal bearings which usually comprise a back of a copper alloy, or a ferrous metal alloy, with a lining of a softer metal formed of a lead base alloy. Such bearings are commonly known as A. A. R. (Association of American Railroads) standard and are used in most railway freight cars and some passenger cars. The backs have plain flat upper faces supporting the journal box either directly or, usually, through an intervening wedge which positions the bearing in the journal box.

This invention has been developed particularly for railway freight cars and such passenger cars as use solid bearings as distinguished from roller bearings, but such bearings could be used also under mine cars and other cars built similar to railway cars, but using smaller size bearings.

The principal object of this invention is to improve the operating characteristics of the journal bearing, and particularly during the early break-in period of a new journal bearing, so that the bearings are less likely to fail during the initial break-in period, thus reducing to a minimum the possibility of failure and resulting in longer service life.

This object is attained by forming the back with a plurality of spaced apart, slightly raised contacting elements having convex areas of cylindrical, conical, or spherical contour so that when the bearing is new these spaced, raised elements will soon wear down to smooth working surfaces of extended area between the load bearing wedge and the journal bearing back. Such wearing is effected by the relative movement of the bearing and wedge lengthwise of the journal axis as results from the continual longitudinal play between the axle and box necessary to accommodate the wheel and track irregularities and the travel of fixedly parallel axles over curved track.

The initial raised convex contact elements are made to slightly different heights or levels so that the load applied to the bearing back by the wedge is applied first to those points on the bearing back which will best distribute the load to the journal along the entire length of the journal bearing liner and these initial contact elements wear down to larger and larger areas of contact by the sliding friction between the bearing back and the wedge so that additional areas come into service to better distribute the load of the wedge over a larger area of the back and thus avoid excessive internal strains within the bearing and provide for longer trouble-free service.

The accompanying drawings and detailed description disclose the ideal arrangement of the journal, bearing, wedge, and box assembly, and some of the difficulties encountered in actual production of the bearings, and an improved bearing embodying the present invention and by which these difficulties are overcome.

In the drawings,

Figure 1 is a perspective of a railway wheeled axle journal, journal bearing, wedge, and journal box assembly.

Figure 2 is a vertical longitudinal section through the center line of the upper portion of the assembly shown in Figure 1, showing the parts in normal working condition and illustrating the initial contour of a perfect bearing.

Figure 3 is a vertical transverse section on line 3—3 of Figure 2.

Figure 4 is a section through a journal bearing as shown in Figure 2 but drawn to a larger scale and illustrating to an exaggerated degree a common tendency of usual journal bearing backs to shrink near the middle of the back during the casting process.

Figure 5 similarly illustrates how a journal bearing back may swell or hump near the middle during the casting process.

Figure 6:
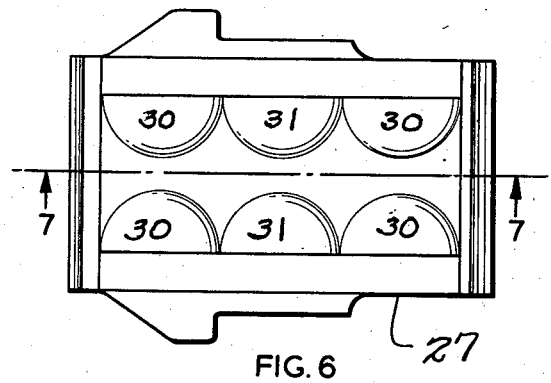

Figure 6 is a plan view of my improved journal bearing back.

Figure 7:
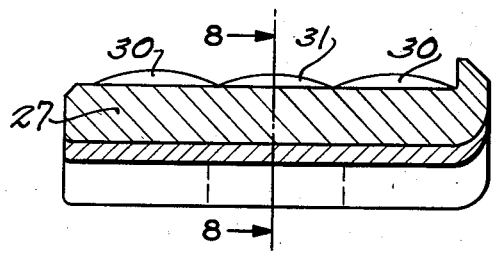

Figure 7 is a longitudinal vertical section on the line 7—7 of Figure 6.

Figure 8:
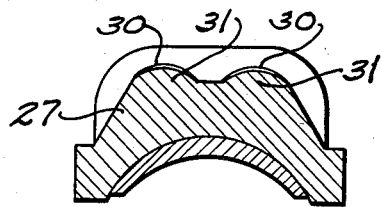

Figure 8 is a transverse vertical section on line 8—8 of Figure 7.

Figures 9, 10:
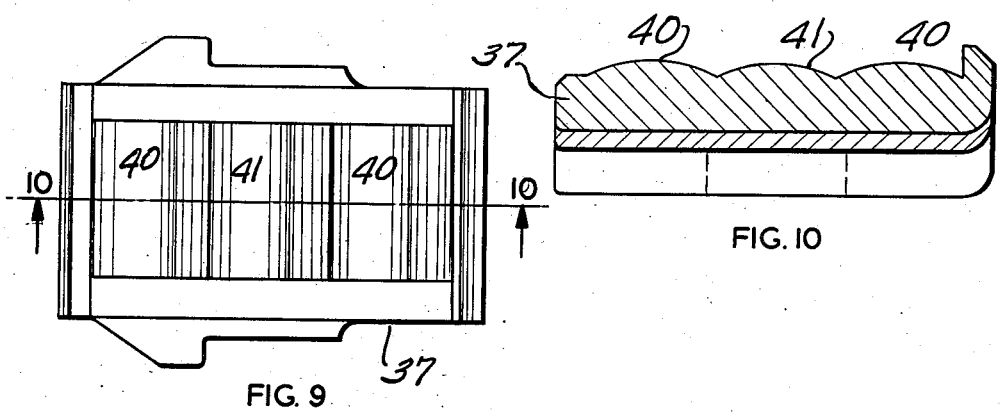

Figure 9 is a plan view of another form of journal bearing back.

Figure 10 is a longitudinal vertical section on line 10—10 of Figure 9.

The axle 11 mounts a wheel 12 and terminates in a journal 13 having a collar 14 at its outer end. Mounted on the journal is the bearing comprising the back 15 and the relatively soft metal liner 16. A wedge 17 is seated on the top face of back 15 and supports the top wall 18 of the journal box on which the truck equalizers or frame or springs are carried.

During the casting and cooling of the bearing backs, there is a tendency for the top face of the back to shrink in cooling, as indicated at X in Figure 4, or to swell, as indicated at Y in Figure 5, if the mold sand has not been rammed properly. This tendency is so well recognized by manufacturers and users that it is customary to allow an irregularity of .015" to .020" on bearing backs as an accepted tolerance. In the event of shrinkage or swelling, as shown in Figures 4 and 5, it is obvious that the bearing will be so loaded that it is likely to fail or to cause the wedge to be distorted or both.

The ideal construction of the parts would be to have the opposing surfaces of bearing back 15 and wedge 17 machine finished so that these surfaces would be in perfect contact throughout their area immediately upon application and would distribute the load uniformly to the bearing back and distribute the load uniformly over the full length of the bearing lining 16 to the journal 13.

Indeed, some railroads now machine finish bearing backs, at least for most severe service, in an attempt to obtain the desired contact throughout the entire area of the opposing faces of the back and wedge. Machine finishing is an expensive operation and therefore is not generally used in freight car service. Even then, the desired objective is not necessarily accomplished due to the fact that the wedge is not machine finished, being drop forged as flat as practical, but frequently being warped on the lower face, which will result in a rocking contact between the wedge and the bearing back even though the bearing back surface is truely flat. A random check of new wedges shows that most of them are slightly warped from a few thousandths of an inch to as much as 1/64". Even one non-contacting corner a few thousandths of an inch low applies no pressure to the adjacent portion of the bearing back and the wedge is likely to rock on the bearing back, thus distributing the load to the soft metal lining of the bearing and to the journal in an irregular and intermittent manner. When the spot pressure is excessive, the lubricant oil film between the lining and the journal is wiped off and the journal or bearing scored, which contributes to eventual failure, particularly of the bearing.

The bearing back detailed in Figures 6-10 is constructed and adapted to meet the conditions described above.

In Figures 6-8, the top face of the back 27 is provided during the casting operation with a series of raised elements 30, 31, here shown as six spherical segments with their high points widely spaced apart. Preferably end elements 30 are slightly higher than middle elements 31. The elements will be approximately 1/64" in height. When a new bearing 27 constructed in this fashion is first put in service, the wedge will always bear on the high points of the four elements 30 and thus distribute the load to all parts of the bearing and avoid rocking of the wedge on the bearing back or rocking of the bearing on the journal. Bearing backs of copper alloys are substantially softer than the steel or iron wedges and, as the box and wedge shift relative to the journal and bearing, these small points of contact will quickly wear down and elements 31 will be brought into load transmitting contact with the wedge. Subsequent wear will enlarge all of the bearing areas until an adequate portion of the bearing back forms stable contact with the wedge.

This desired contact will be effected after short use of the bearing irrespective of irregularities in casting of the bearing back or in forging of the wedge.

Figures 9 and 10 show another form of the invention in which the top face of the back 37 is provided during casting with a series of raised elements 40, 41 having cylindrical segmental contours and preferably the end elements 40 being slightly higher than central element 41.

These elements provide spaced line contacts between the bearing back and the underface of the wedge at the initial assembly of the parts. These line contacts are soon worn down until there is a third line contact by the bearing 41 and further wear results in a flat interface relation for extended opposing surfaces of the bearing back and wedge.

Following a running test in which a set of eight of these journal bearings were installed on a railway tank car and operated approximately 1,500 miles, half the mileage under load and the other half on the return trips. All eight bearings showed a uniform bearing area between the lower face of the wedge and the back of the journal bearings at the points originally selected as the most desirable for the initial contact. Likewise, all journal bearings showed a perfect and uniform bearing area in the crown of the lining metal where it operated against the rotating journal.

This invention should be especially helpful when the bearings are applied to undersize journals or journals with slight but permissible taper, which are necessarily used by the railroads in order to avoid excessive axle cost if such axles were scrapped early and replaced with new axles.

It is possible that a metal or alloy may be developed which may be strong enough, and at the same time soft enough and having necessary anti-friction qualities, that a separate back lining may be unnecessary, and the back of this invention would likewise improve the service qualities of such a journal bearing.

While the invention is illustrated and described as embodied in specifically formed and arranged contact elements on a standard A. A. R. bearing back of cast metal with a soft metal lining, it will be understood that the essential features of the invention may be embodied in structures other than I have shown without departing from the spirit of the invention and the exclusive use of those modifications coming within the scope of the claims is contemplated.

What is claimed is:

1. A railway axle journal bearing back and liner unit having a journal-fitting concave lower face and a wedge supporting upper face, there being an upright flange at an end of the upper face for engaging a journal wedge, there being a plurality of relatively slight upward projections near the ends and sides of said upper face and intermediate the ends of said upper face and spaced apart from each other and each projection having upwardly converging sides merging together to form minute upper surfaces projecting above said upper face a relatively slight distance substantially but terminating below the level of the top of said flange and readily wearable away by sliding contact with a wedge mounted on the unit.

2. A railway axle journal bearing back and liner unit having a journal-fitting concave lower face and having a load-supporting upper face extending substantially from side to side and from end to end of the unit, said upper face being initially provided with a plurality of raised wear elements near the sides and ends of said face and intermediate said sides and ends and spaced substantially from each other and on the order of approximately 1/64" in height and each having upwardly converging sides merging together at the apices of the elements.

3. A solid one-piece bearing back having a concave downwardly-presented surface faced with a liner for a railway axle journal and having a substantially horizontal upwardly-presented top face for supporting a journal box top wall or a journal box wedge, the back being characterized by having said top face provided with a plurality of upwardly extending projections of a height on the order of 1/64 of an inch, and each having upwardly converging sides merging at the upper ends of the projections, said projections being spaced apart and positioned substantially throughout the entire length and width of said top face, the projections nearest the middle of said top face being of slightly less height than those near the sides and ends of said top face.

4. A solid one-piece bearing back having a concave downwardly-presented surface faced with a liner for a railway axle journal and having a substantially horizontal upwardly-presented top face for supporting a journal box top wall or a journal box wedge, the back being characterized by having said top face formed with a series of upstanding ridges approximately 1/64 of an inch high and extending transversely of and being spaced apart over the entire length of said top face, the sides of each of said ridges converging upwardly and merging in each other, the end ridges being slightly higher than the center ridges.

5. A railway axle journal bearing back according to claim 1 in which the upward projections comprise spherical segments at opposite sides of the center line of the back and near opposite ends of the back.

6. A railway axle journal bearing back according to claim 1 in which the upward projections include cylindrical segments elongated transversely of the center line of the back and positioned near opposite ends of the back.

References Cited in the file of this patent
UNITED STATES PATENTS

| | | |
|---|---|---|
| 345,232 | Harrison | July 6, 1886 |
| 748,258 | Buker | Dec. 29, 1903 |
| 826,202 | Stucki | July 17, 1906 |
| 884,050 | Streeter | Apr. 7, 1908 |
| 1,056,256 | Campbell | Mar. 18, 1913 |
| 2,154,916 | Pearce | Apr. 18, 1939 |